S. L. PRICE.
CENTRIFUGAL SPEED REGULATOR.
APPLICATION FILED MAY 27, 1913.
1,208,208.
Patented Dec. 12, 1916.
2 SHEETS—SHEET 2.
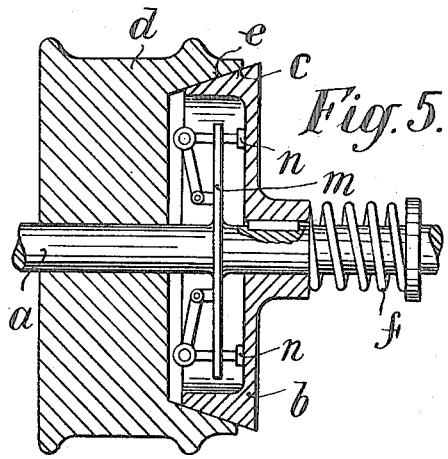
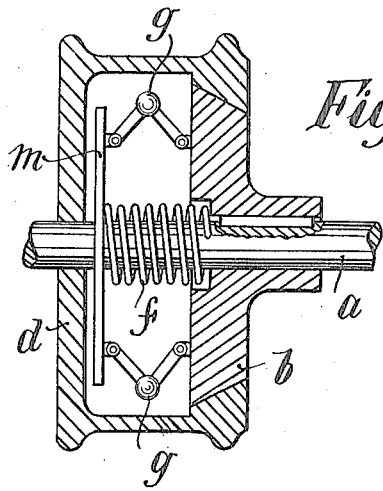
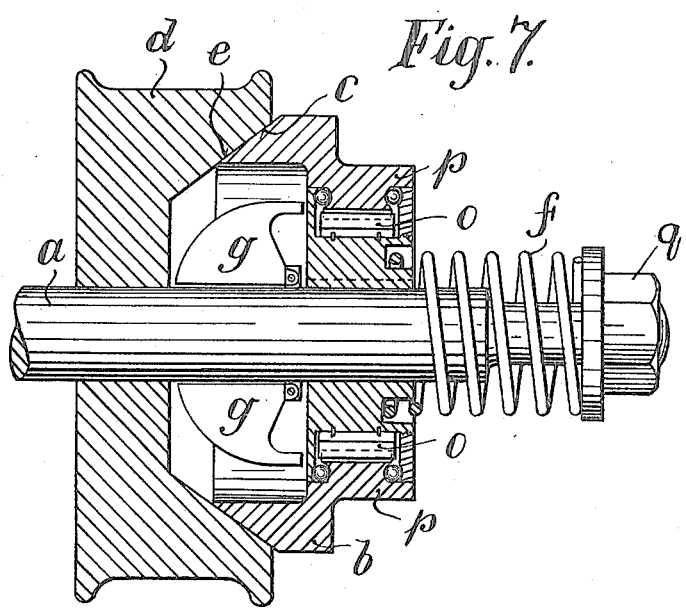

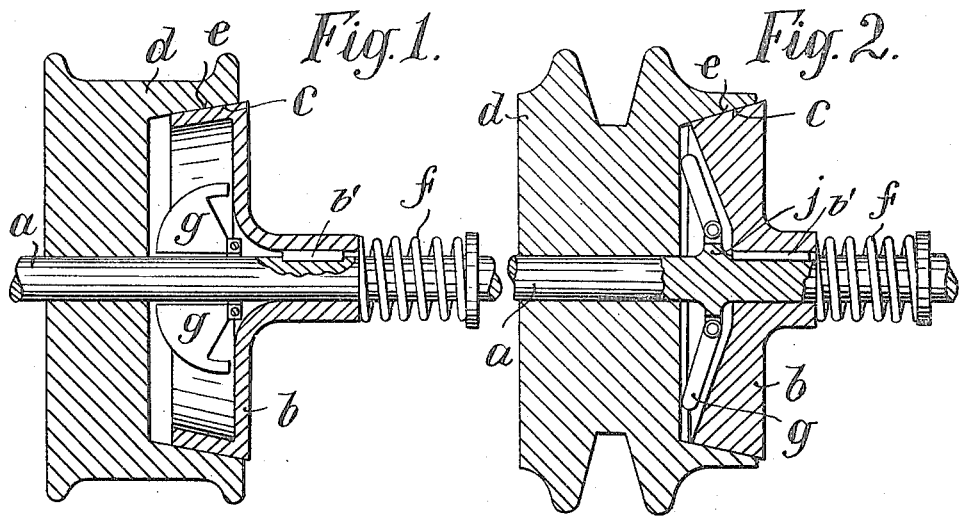
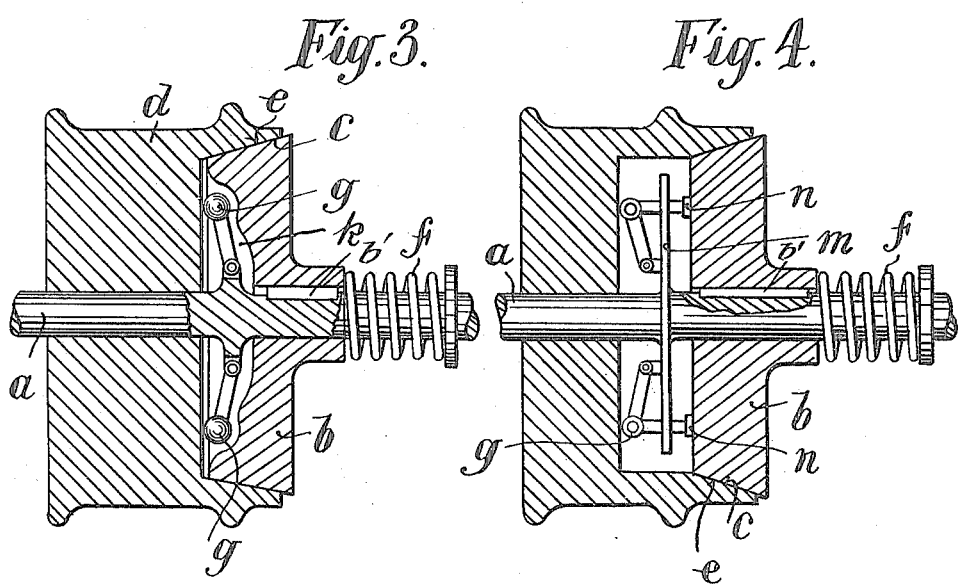

UNITED STATES PATENT OFFICE.

SIDNEY LEOPOLD PRICE, OF HOLBORN, LONDON, ENGLAND.

CENTRIFUGAL SPEED-REGULATOR.

1,208,208.

Specification of Letters Patent.   Patented Dec. 12, 1916.

Application filed May 27, 1913. Serial No. 770,146.

*To all whom it may concern:*

Be it known that I, SIDNEY LEOPOLD PRICE, of 62 Eagle street, Holborn, in the county of London, England, have invented certain new and useful Improvements in Centrifugal Speed-Regulators, of which the following is a specification.

This invention relates to centrifugal speed regulators of the type in which the clutching members are pressed into engagement by a spring or springs and permitted to slip by the disengaging action of hinged centrifugal members disposed within the driving or driven members.

The object of this invention is to provide an improved speed regulator.

A speed regulator made in accordance with this invention comprises centrifugal members attached to the shaft or nonslidable part of the driven member, and adapted to coact with the slidable part of the driven member to press it out of engagement with the driving member or reduce the pressure between the clutch faces. In cases where the centrifugal members have been attached to the shaft or non-slidable part of the driven member they have been disposed outside the clutch members.

A speed regulator made in accordance with this invention is especially adapted for use in driving a dynamo at uniform speed from a motor or other driving power having a varying speed.

Figures 1 to 7 are diagrammatic sections of a regulator made in accordance with this invention.

In Fig. 1 of the drawings, $a$ is the shaft of the dynamo or driven member, $b$ is a clutch member slidably mounted thereon and rotating therewith and having a clutch face $c$, the key $b'$ preventing rotation of the driven member with respect to the shaft. $d$ is a pulley mounted on the shaft $a$ and adapted to rotate freely thereon and provided with a clutch face $e$ adapted to engage the clutch face $c$ on the slidable member. $f$ is a spring adapted to keep the clutch faces in engagement with one another. $g\ g$ are centrifugal members pivoted to the shaft or non-slidable part of the driven member and adapted to coact with the slidable part of the driven member to force the faces of the clutch members apart so that they slip on one another when a predetermined speed of the driven member has been attained.

In use, when the clutch faces are in engagement, the shaft $a$ is driven by frictional contact between the clutch faces. When the speed of the dynamo or driven member has attained the predetermined speed the centrifugal members $g\ g$ bear against the driven member and force it away from the driving member, against the action of the spring $f$, thus reducing the friction between the clutch faces and permitting one to slip on the other. When the speed of the driven member falls below the predetermined speed, the centrifugal members fall and the spring forces the clutch faces together reducing the amount of slip and allowing the clutch to grip tightly. In this manner a regular speed of the driven member is insured.

In Fig. 2 the centrifugal members are mounted on a disk or arms $j$ on the shaft or non-slidable member $a$.

In Fig. 3 the slidable member is recessed as at $k$.

In Figs. 4 and 5 the centrifugal members are mounted on arms or disks $m$ and are provided with extensions $n$ which bear on the slidable clutch member.

In Fig. 6 the disk or arm $m$ is attached to the shaft $a$ or non-slidable part of the driven member, and a spring $f$ is placed between the disk or arm $m$ and the clutch member $b$. $g\ g$ are centrifugal members mounted between the arm $m$ and the clutch $b$. In operation when the predetermined speed is reached the centrifugal members fly out and retract the clutch members $b$.

In Fig. 7 $o\ o\ o$ are pawls and $p$ is a ratchet to insure that the driven member can be driven only in one direction by the driving member.

In operation when the regulator is used for driving a dynamo for the purpose of charging accumulators, should the speed of the driving member fall below a speed at which the accumulators can be charged, or should the driving member cease to rotate by reason of the stopping of the driving power, then the driven member is driven directly by the generator which becomes a motor, and the ratchet slips over the pawls. When the shaft attains the predetermined speed, the centrifugal members come into action and throw the clutch faces out of engagement, the ratchet ceases to ride over the pawls, and the clutch member is driven freely with the shaft. Instead of placing the ratchet on the driven member it may be placed on the driving member with the same effect.

A regulator made in accordance with the invention may be combined with a non-rotatable retractable device as described in my British patent specification No. 13,555 of 6th June, 1911. The regulator may be inclosed in a casing forming part of, or an extension of, the driving member.

Regulators made in accordance with this invention are especially adapted for use in connection with lighting plant in road and railway vehicles.

In some cases the centrifugal members may be so shaped that when in their normal or closed position, they embrace the shaft and form approximately a truncated cone.

Means may be provided for adjusting the spring by a nut $q$ or otherwise.

What I claim and desire to secure by Letters Patent is:—

1. A speed regulator comprising a rotatable shaft, a driving member mounted loosely upon the shaft and having a clutch face, a driven member slidably mounted on said shaft, means for preventing rotation of the driven member with respect to the shaft, said driven member having a clutch face to engage the clutch face of the driving member, yieldable means for normally maintaining the clutch face of the driven member in firm contact with the clutch face of the driving member, said clutch members forming an inclosed chamber, centrifugal members mounted pivotally on the shaft within said chamber, said centrifugal members engaging the driven member and moving the same to a position of less pressure upon the driving member when the shaft attains a predetermined speed.

2. A speed regulator comprising a rotatable shaft, a driving member mounted loosely upon said shaft and having a clutch face, a driven member including an annular inner section and an annular outer section arranged concentric to the inner section and having a clutch face, the inner section of the driven member being slidably mounted on said shaft, means for securing the inner section of the driven member against rotation relative to the shaft, means for preventing rotation of the outer section of the driven member upon the inner section thereof in one direction, said clutch face on the driven member being adapted to engage the clutch face of the driving member, yieldable means for normally maintaining the clutch face of the driven member in firm contact with the clutch face of the driving member, said clutch member forming an inclosed chamber, centrifugal members mounted pivotally on the shaft within said chamber, said centrifugal members engaging the driven member and moving the same to a position of less pressure upon the driving member when the shaft attains a predetermined speed.

In testimony whereof I have signed my name to this specification in the presence of two subscribing witnesses.

SIDNEY LEOPOLD PRICE.

Witnesses:
REGINALD EATON ELLIS,
ROBERT MILTON SPEARPOINT.